United States Patent [19]

Bown et al.

[11] 4,026,645
[45] May 31, 1977

[54] CIRCULAR PHOTOGRAPHIC SLIDE TRAY

[75] Inventors: Eric B. Bown, Royersford; Harold P. Mueller, III; Elton Robertson, both of Philadelphia, all of Pa.

[73] Assignee: Information Design Corporation of America, Philadelphia, Pa.

[22] Filed: Mar. 8, 1976

[21] Appl. No.: 664,900

[52] U.S. Cl. ............................ 353/118; 206/565; 211/41; 206/585
[51] Int. Cl.² .................. G03B 23/00; B65D 1/34; A47G 19/08
[58] Field of Search ................ 206/73; 211/40, 41, 211/51; 312/184; 353/DIG. 1, 118

[56] References Cited

UNITED STATES PATENTS

| | | |
|---|---|---|
| 2,954,033 | 9/1960 | Marsden .............................. 206/73 |
| 2,983,387 | 5/1961 | Klein .................................. 211/40 |
| 3,081,870 | 3/1963 | Plettner .............................. 206/73 |
| 3,486,818 | 12/1969 | Hoppmann et al. ............... 353/118 |
| 3,532,421 | 10/1970 | Schlessel ............................ 206/73 |
| 3,942,639 | 3/1976 | Cournoyer et al. ................. 211/41 |

Primary Examiner—Steven L. Stephan
Attorney, Agent, or Firm—Arthur A. Jacobs

[57] ABSTRACT

A circular tray for photographic slide projectors wherein the tray is provided with slide holders that are capable of being repositioned, together with the slide thereof, in any position circumferentially of the tray.

6 Claims, 7 Drawing Figures

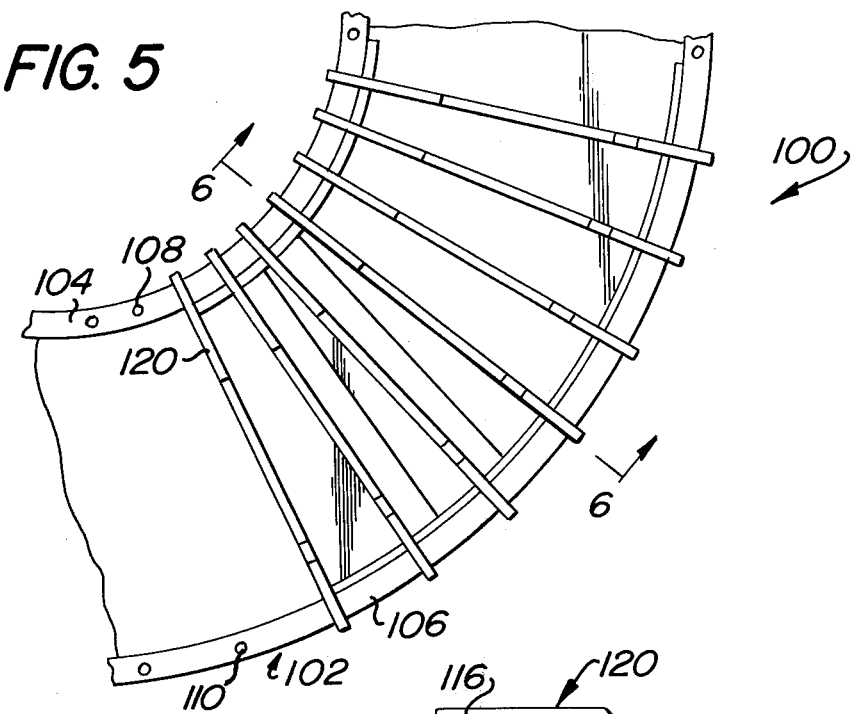
FIG. 5
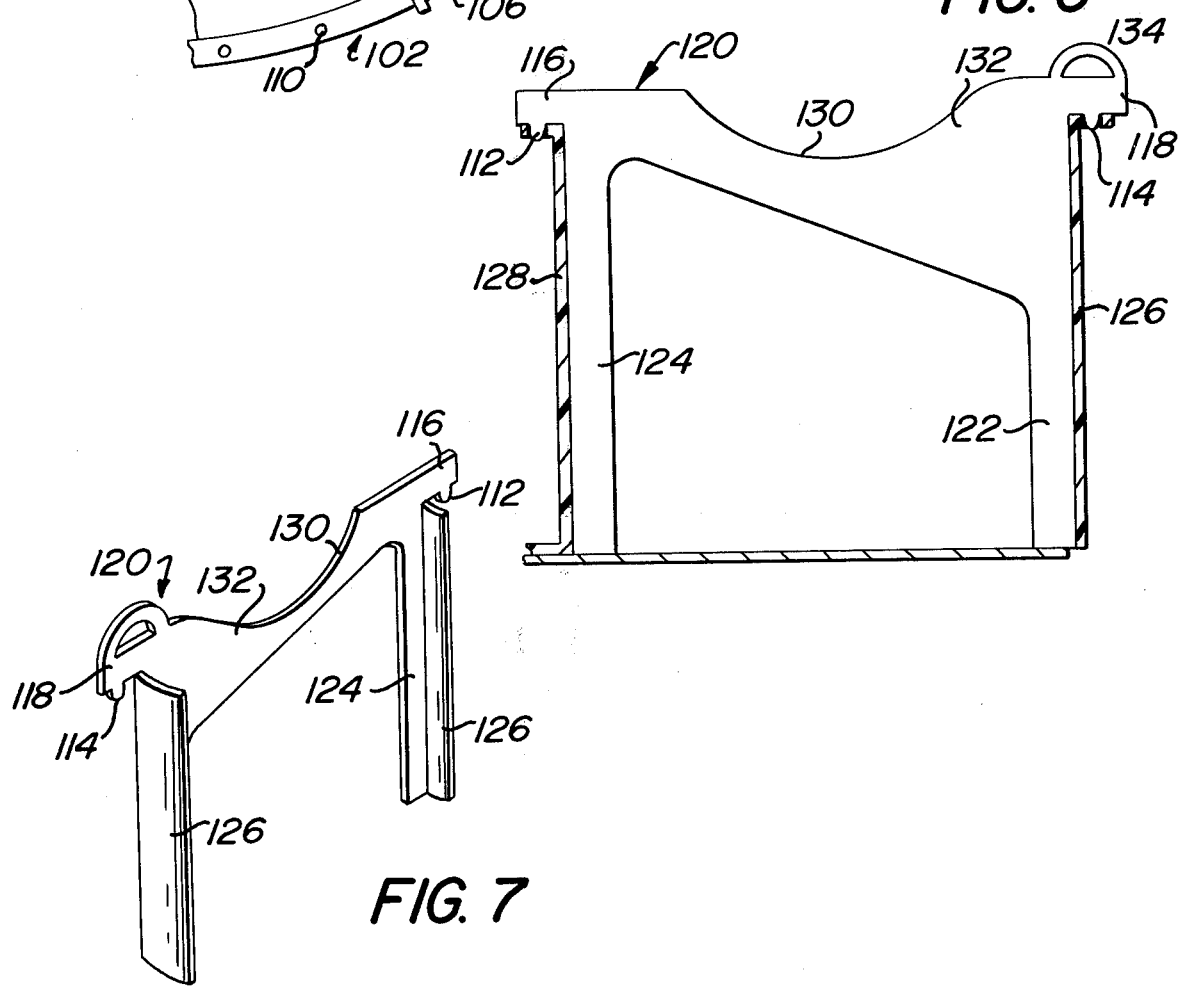
FIG. 6
FIG. 7

CIRCULAR PHOTOGRAPHIC SLIDE TRAY

This invention relates to circular trays for photographic slide projectors, and it particularly relates to trays of the aforesaid type having means to easily change the positions of slides in the trays.

Circular slide trays are in common use in many different types of slide projectors. The standard variety of such trays are constructed with a pair of concentric circular walls having a series of integrally connected radial partitions or wall between them. These walls form fixed slots into each of which a slide is dropped.

Circular trays of the aforesaid standard type have an inherent problem whereby in order to change the position of a slide, it is necessary to remove the slide from its slot, and then move all the other slides one slot over until the slot is reached into which the particular slide is to be placed. This is a time-consuming, annoying and energy-wasting process.

It is an object of the present invention to overcome the above and other disadvantages of prior circular slide trays by providing a circular tray where the slide to be changed and its slot-forming holder can be easily and simply removed and set in its new position without disturbing the positions of other slides already in place, or to move major groups of slides relatively to each other, or to close gaps created by removal of a slide or slides or its or their holders.

Another object of the present invention is to provide a circular slide tray of the aforesaid type that is relatively simple in construction, relatively inexpensive to produce and easy to use.

Other objects and many of the attendant advantages of this invention will be readily appreciated as the same becomes better understood by reference to the following description when read in conjunction with the accompanying drawings wherein:

FIG. 5 is a fragmentary top plan view of a modification of the invention.

FIG. 6 is a sectional view taken on line 6—6 of FIG. 5.

FIG. 7 is a rear perspective view of one of the holders used in the tray of FIG. 5.

Figure 1:
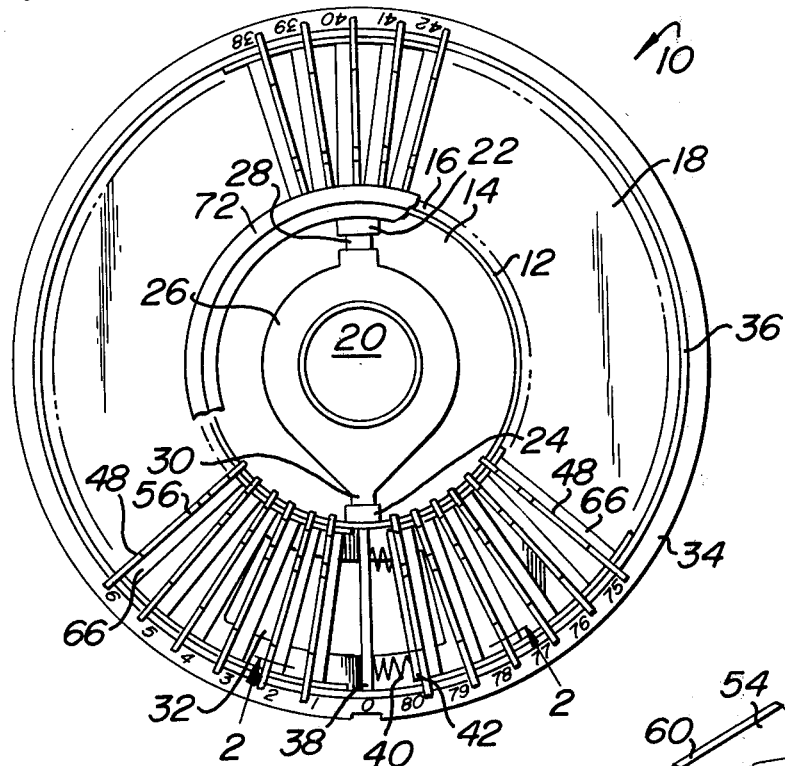
FIG. 1 is a top plan view of a slide tray embodying the present invention.
Figure 3:
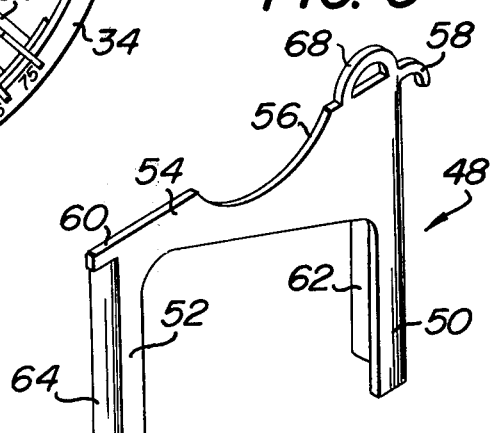
FIG. 3 is a front perspective view of a holder used in the tray of FIG. 1.
Figure 2:
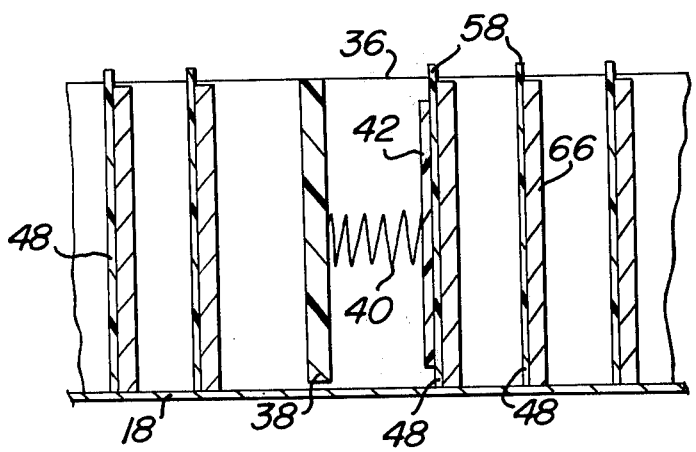
FIG. 2 is a sectional view taken on line 2—2 of FIG. 1.

Referring now in greater detail to the figures of the drawings wherein similar reference characters refer to similar parts, there is shown in FIG. 1 a circular tray, generally designated 10. The construction of this tray is similar to that of the standard Kodak "Carousel" universal slide tray except fo the changes embodying the present invention. Therefore, only the parts embodying the present invention will be specifically described, the remaining parts being of the same construction and functioning in the same manner as the said Carousel tray.

The tray 10 comprises an inner circular upstanding wall 12 integral with a circular plate 14 having an upstanding rim 16 defining an undercut channel. The inner peripheral edge of a circular plate 18 is held in the undercut channel by screws (not shown). The plate 14 is provided with a central opening 20 and with a pair of oppositely-disposed hollow bosses 22 and 24. A metal ring 26 is positioned on the plate 14 with the opening in the ring being generally coaxial with the opening 20. The ring 26 is provided with oppositely-disposed flanges 28 and 30 which are slidably engaged in the corresponding hollow bosses 22 and 24, whereby the ring is capable of limited lateral sliding movement relative to the plate 14. The above described parts 14 to 30 form what may be called the hub portion.

The plate 18 is provided with a slot 32 and has its outer peripheral edge underlying a lateral flange 34 integral with the bottom edge of an outer circular wall 36 concentric with the inner wall 12. The bottom of the flange 34 is provided with a series of equidistantly-spaced studs (not shown) corresponding to the successive positions of the slides. The inner and outer walls 12 and 36 and the bottom wall 18 form the frame of the tray.

The construction so far described is similar to that of the standard Carousel tray and the parts described function in the same manner as in the standard tray. Since the construction, by itself, forms no part of the present invention, the details thereof and the functioning thereof need not be further described herein.

With respect to the details of the present invention itself, there is provided a fixed wall or partition 38 extending between the inner and outer walls 12 and 36 at the 0 position. Connected to the partition 38 are springs 40 which are connected at their opposite ends to a plate 42. The plate 42 resiliently bears against the adjacent slide holder (hereinafter described).

Adapted to be positioned between the inner and outer walls 12 and 36 are a plurality of slide holders 48. Each slide holder 48 comprises a pair of legs 50 and 52 connected by an upper bridge member 54. The bridge member 54 is provided with an arcuate recess 56 to permit grasping of a slide to insert and remove it from the holder. The bridge member also has a lateral extension 58 on one side which is curved downwardly and a straight lateral extension 60 on the opposite side. The leg 50 is provided with an arcuate flange 62 and the leg 52 is provided with an arcuate flange 64, the curveture of flange 62 corresponding closely to that of the outer wall 36 while the curveture of the flange 64 corresponds closely to that of the inner wall 12. These closely corresponding curvetures permit a close fit of the holders when they are placed in position with their respective extensions 60 overhanging the inner wall 12 and their respective extensions 58 overhanging the outer wall 36.

The holders are assembled on the tray by placing them adjacent each other with the respective extensions 58 and 60 overhanging the respective walls 36 and 12. In such positions the spring-pressed plate 42 bears against the adjacent holder and maintains all the holders in resilient contact with each other in such manner that the flanges 62 and 64 act as spacers whereby compartments are formed between adjacent holders. Each of these compartments is adapted to receive a slide, indicated at 66, the slide being so inserted that its side edges are slightly spaced from flanges 62 and 64 of the corresponding holder.

Where it is desired to move a particular slide from one position to another, the user merely grasps the slide and the bridgemember 54 between the fingers and lifts both the holder and the slide out, the spring-pressed plate 42 acting to automatically take up the slack. The slide and its holder which was removed is then inserted in the desired new position by separating the holders at the position desired, against the bias of the spring and inserting the slide and its holder into the space formed at such position; after which the separated spring-pressed plates are released. Preferably, a handle 68 is provided adjacent the extension 58 to aid in lifting and inserting the holder.

Figure 4:
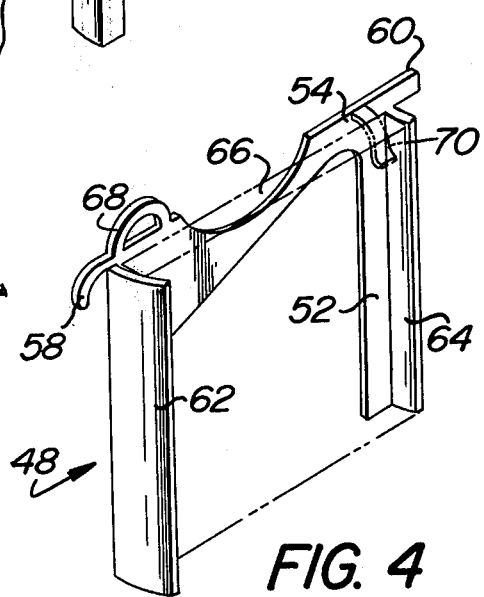
FIG. 4 is a rear perspective view of the holder of FIG. 3.

If desired, as an optional feature, a spring detent, such as shown at 70 in FIG. 4, may be used to resiliently hold the slide against the holder. This spring detent must have sufficient resiliency to permit the slide to be moved down into viewing position and then back up under the detent without interfering with the action of the projector. The detent, however, must also have sufficient tension to retain the slide and holder together when moved as a unit. This obviates the necessity of grasping both the holder and slide during repositioning. However, since it is often difficult to maintain the exact desired tension in the spring detent, it may often be preferable to omit it. A removable locking ring 72, of the standard type, fits over the extensions 60 as they rest on the top of wall 12, to retain the slide holders in place in the same manner as in the standard Carousel tray.

In FIGS. 5–7, there is shown a modified form of the invention which, although lessppreferable, may sometimes be desirable. In this form of the invention, generally designated 100, the tray itself, indicated broadly at 102, is generally the same as that shown in FIG. 1 and need not be further described, except that the inner wall 104 and the outer wall 106 are each provided with a series of apertures, as at 108 and 110 respectively, and there are no spring-pressed plates at either side of the fixed partition. These apertures are adapted to receive corresponding lugs, indicated at 112 and 114 (see FIG. 6) which depend from the respective extensions 116 and 118 of holders such as shown at 120. The holders 120 are, otherwise, identical to those shown at 48, having legs 122 and 124, with respective arcuate flanges 126 and 128, and an arcuate recess 130 in the bridge member 132. Here, too, there are preferably provided handles 134 adjacent the extensions 118.

In the operation of this form of the invention, the respective holders are hung in their positions by means of the lugs 112 and 114 fitting into the apertures 108 and 110. When it is desired to rearrange a slide, the slide and its holder are grasped, as described previously and removed from the position. The other holders and slides are then moved to the next positions until the desired position for the moved slide is reached. Then the moved slide is inserted in that position.

This form of the invention is less preferable because it requires adjusting the positions of many slides rather than only one. However, it is still preferable to the standard slide tray because it is not necessary to laboriously remove each slide from its compartment and insert it into the next compartment, but the entire compartment, i.e. the holder, and the slide are moved as a unit.

The invention claimed is:

1. A photographic slide projector tray comprising a hub portion to which is connected a circular tray frame, said tray frame including an annular bottom wall and inner and outer circumferential walls upstanding from the corresponding inner and outer peripheral edges of said bottom wall, a plurality of holders releasably positioned in said frame between said inner and outer circumferential walls, each of said holders having spacing means constructed to space each holder from the holders adjacent thereto when said holders are positioned in said frame, whereby slide-holding compartments are formed between adjacent holders, each of said holders and corresponding slides held thereby being adjustable to different positions relative to the other holders on said frame and being releasably engageable and disengageable from said frame in each position of adjustment, a fixed radial partition provided at a selected position on said frame between said inner and outer circumferential walls, resilient biasing means connected to a face of said partition, said holders being arranged in series around the circumferential extent of said frame, on either side of said partition, and said biasing means urging all said holders against each other circumferentially of said frame.

2. The tray of claim 1 wherein each of said holders is provided with an arcuate flange on its edge adjacent said inner circumferential wall and an arcuate flange on its edge adjacent said outer circumferential wall, said flanges each having an arcuate curveture corresponding to its respective inner and outer circumferential wall and being in slidable contact with said respective inner and outer circumferential wall.

3. The tray of claim 1 wherein each of said holders is provided with a pair of oppositely-disposed lateral extensions, one of said extensions overlying said inner circumferential wall and the other of said extensions overlying said outer circumferential wall.

4. The tray of claim 3 wherein said extensions are in slidable engagement with the respective inner and outer circumferential walls.

5. The tray of claim 1 wherein a resilient engagement means is provided on each holder to releasably hold a slide in said holder.

6. The tray of claim 1 wherein said biasing means comprises a plate slidable circumferentially of said frame, said plate being connected by resilient means to the adjacent face of said partition, said plate being resiliently urged toward the holder adjacent thereto in said frame.

* * * * *